United States Patent
Bell et al.

(10) Patent No.: US 10,635,736 B2
(45) Date of Patent: *Apr. 28, 2020

(54) SYSTEM, METHOD AND COMPUTER PROGRAM PRODUCT FOR DATA TRANSFER MANAGEMENT

(71) Applicant: International Business Machines Corporation, Armonk, NY (US)

(72) Inventors: Robert H. Bell, Austin, TX (US); Louis B. Capps, Georgetown, TX (US); Daniel M. Dreps, Georgetown, TX (US); Luis A. Lastras-Montano, Cortlandt Manor, NY (US); Michael J. Shapiro, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 15/881,756

(22) Filed: Jan. 27, 2018

(65) Prior Publication Data

US 2018/0165377 A1    Jun. 14, 2018

Related U.S. Application Data

(63) Continuation of application No. 12/786,072, filed on May 24, 2010, now Pat. No. 9,881,099.

(51) Int. Cl.
*G06F 12/00* (2006.01)
*G06F 16/957* (2019.01)
(Continued)

(52) U.S. Cl.
CPC ........ *G06F 16/957* (2019.01); *G06F 16/5854* (2019.01); *G06K 9/6202* (2013.01)

(58) Field of Classification Search
CPC ........ G06F 17/30899; G06F 17/30256; G06K 9/6202

See application file for complete search history.

(56) References Cited

U.S. PATENT DOCUMENTS

| 5,014,327 A | 5/1991 | Potter et al. |
| 5,630,092 A | 4/1997 | Carreiro et al. |

(Continued)

OTHER PUBLICATIONS

Balfour, James, et al.; Design Tradeoffs for Tiled CMP On-Chip Networks; Computer Systems Laboratory Stanford University; Jun. 2006; pp. 187-198.

(Continued)

*Primary Examiner* — Gurtej Bansal
(74) *Attorney, Agent, or Firm* — James L. Baudino (57) ABSTRACT

According to one aspect of the present disclosure a method and technique for managing data transfer includes receiving and storing a plurality of different data patterns anticipated to be encountered by a processor unit of a data processing system corresponding to a particular application being processed. Responsive to receiving a read request for data, the requested data is read from a memory subsystem, and the read data is compared by the memory subsystem to the stored data patterns. Responsive to determining that the read data matches at least one of the stored data patterns, the memory subsystem replaces the matching read data with a pattern tag corresponding to the matching data pattern. The pattern tag is transmitted to the processor unit instead of the requested data as a response to the read request, and the processor unit replaces the pattern tag with the corresponding data pattern.

18 Claims, 4 Drawing Sheets

(51) Int. Cl.
   *G06K 9/62*     (2006.01)
   *G06F 16/583*   (2019.01)

(56) References Cited

U.S. PATENT DOCUMENTS

| | | |
|---|---|---|
| 5,812,817 A | 9/1998 | Hovis et al. |
| 5,864,859 A | 1/1999 | Franaszek |
| 6,145,069 A | 11/2000 | Dye |
| 6,362,756 B1 | 3/2002 | Shannon |
| 6,370,631 B1 | 4/2002 | Dye |
| 6,618,831 B2 | 9/2003 | Lippincott |
| 6,654,874 B1 | 11/2003 | Lee |
| 7,129,860 B2 | 10/2006 | Alvarez, II et al. |
| 7,190,284 B1 | 3/2007 | Dye et al. |
| 7,457,940 B2 | 11/2008 | Bacon et al. |
| 8,255,657 B2 | 8/2012 | Kimura |
| 2002/0037035 A1 | 3/2002 | Singh |
| 2003/0135694 A1 | 7/2003 | Naffziger et al. |
| 2003/0229636 A1 | 12/2003 | Mattausch et al. |
| 2003/0229761 A1 | 12/2003 | Basu et al. |
| 2004/0083245 A1 | 4/2004 | Beeler, Jr. |
| 2004/0168012 A1 | 8/2004 | Tsai |
| 2005/0152606 A1 | 7/2005 | Wood |
| 2007/0150621 A1 | 6/2007 | Kravec et al. |
| 2009/0193219 A1 | 7/2009 | Ohira et al. |
| 2011/0106936 A1 | 5/2011 | Galbreath et al. |
| 2011/0199241 A1 | 8/2011 | Torii |

OTHER PUBLICATIONS

Dally, William J., et al.; Route Packets, Not Wires: On-Chip Interconnection Networks; Computer Suystems Laboratory Stanford University; Jun. 2001; pp. 684-689.

SYSTEM, METHOD AND COMPUTER PROGRAM PRODUCT FOR DATA TRANSFER MANAGEMENT

BACKGROUND

In computer systems, data compression techniques are frequently used to conserve memory space and reduce the latency associated with data access (e.g., data read and write operations). For example, a central processor unit (CPU) may employ a data compression algorithm for compressing data and communicating the compressed data to a memory or storage subsystem. In a read operation, the compressed data is read from the memory or storage subsystem and decompressed by the CPU for further processing. Compressing the data decreases the size of the data stream being transferred and increases the bandwidth of the data transmission between the CPU and a storage system.

BRIEF SUMMARY

According to one aspect of the present disclosure a method and technique for managing data transfer is disclosed. The method includes receiving and storing a plurality of different data patterns anticipated to be encountered by a processor unit of a data processing system corresponding to a particular application being processed. Responsive to receiving a read request for data, the requested data is read from a memory subsystem, and the read data is compared by the memory subsystem to the stored data patterns. Responsive to determining that the read data matches at least one of the stored data patterns, the memory subsystem replaces the matching read data with a pattern tag corresponding to the matching data pattern. The pattern tag is transmitted to the processor unit instead of the requested data as a response to the read request, and the processor unit replaces the pattern tag with the corresponding data pattern.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a method, system and computer program product for managing data transfer. For example, in some embodiments, in a data processing system having a processor unit, data to be written to a memory subsystem by the processor unit is compared to stored data patterns. The stored data patterns are representative of data patterns likely to be encountered by the processor unit in processing different data. If the data to be written matches a particular data pattern, a pattern tag is substituted for the corresponding data pattern and the pattern tag is transmitted to the memory subsystem.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
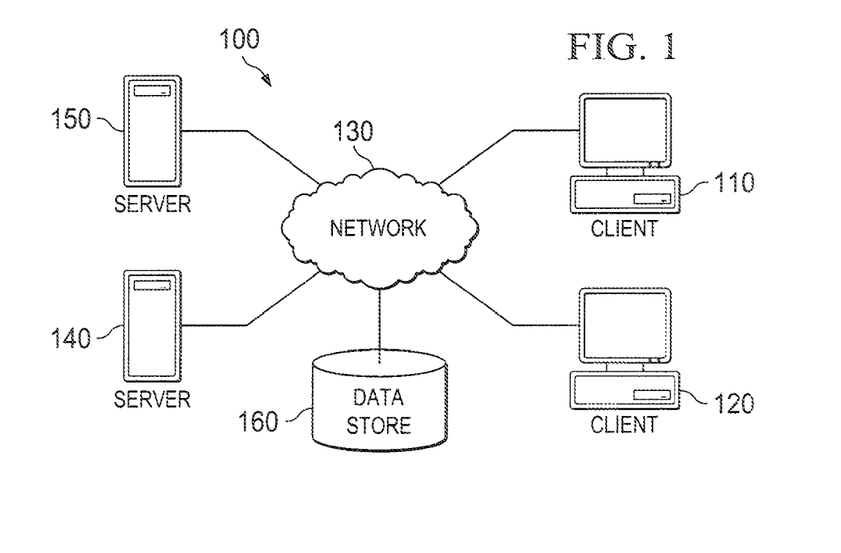
FIG. 1 is an embodiment of a network of data processing systems in which the illustrative embodiments of the present disclosure may be implemented.
Figure 2:
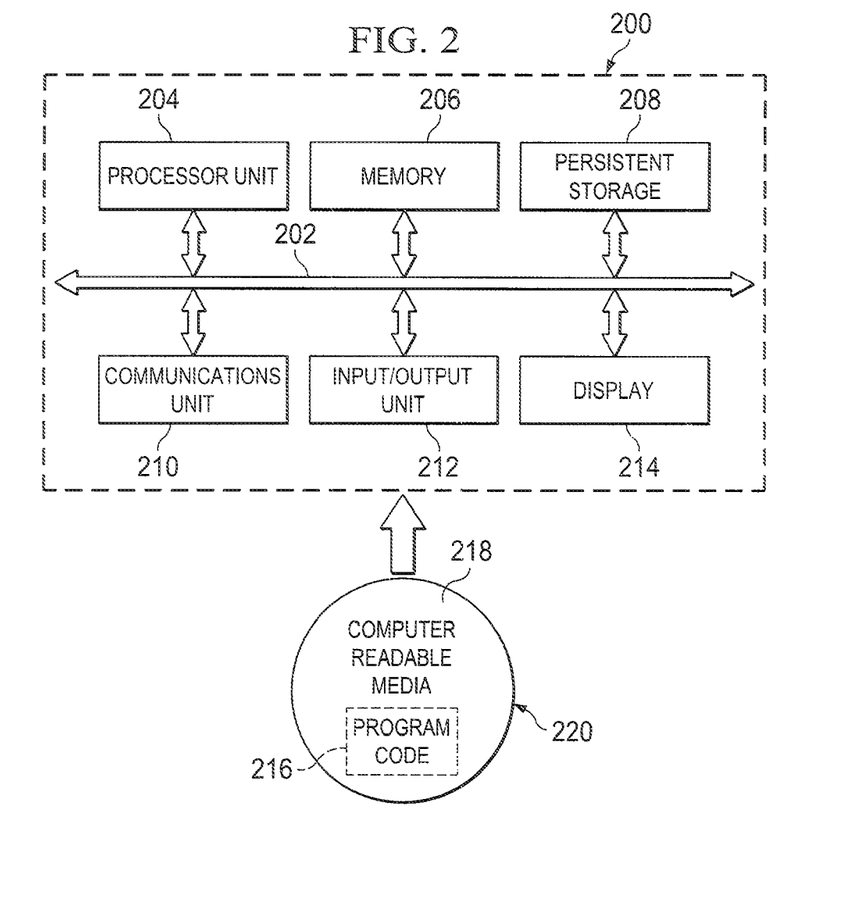
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System P® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a data transfer management system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
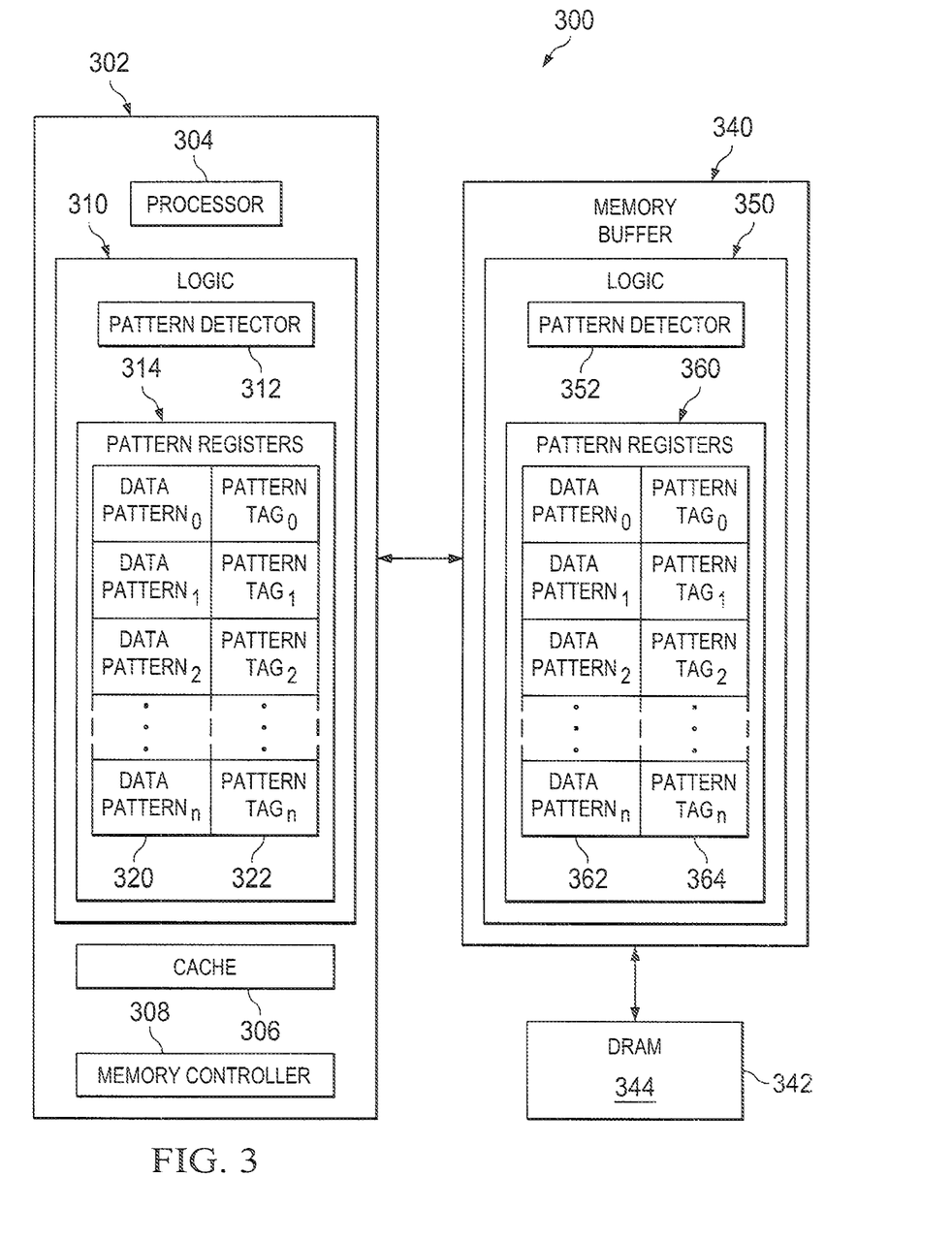
FIG. 3 is a diagram illustrating an embodiment of a data processing system in which illustrative embodiments of a data transfer management system may be implemented.

FIG. 3 is an illustrative embodiment of a data transfer management system 300. System 300 may be implemented on a data processing system or platform such as, but not limited to, servers 140 and/or 150, clients 110 and/or 120, or at other a data processing system locations. In the embodiment illustrated in FIG. 3, system 300 comprises a processor unit 302 having a core processor 304, a memory cache 306 and a memory controller 308. In FIG. 3, system 300 also includes a memory buffer 340 and a storage or memory device 342. In the illustrated embodiment, memory device 342 comprises a dynamic random access memory (DRAM) 344; however, it should be understood that other types of storage or memory devices may be used. Memory controller 308 is used to control various data read and/or write operations between processor unit 302 and a memory subsystem. As used herein, a memory subsystem may comprise any type or combination of memory/storage elements or devices for permanently or temporarily storing various types of data such as, but not limited to, cache 306, memory buffer 340 and memory device 342.

In FIG. 3, processor unit 302 also comprises programmable logic 310 having a pattern detector 312 and one or more pattern registers 314. Pattern detector 312 and/or programmable logic 310 may reside as software and/or an algorithm running on processor unit 302; however, it should be understood that pattern detector 312 and/or programmable logic 310 may comprise hardware logic residing in a processor or other type of logic chip. The functions of pattern detector 312 and/or programmable logic 310 may also be centralized in a single integrated circuit or distributed among different chips in a data processing system. Pattern registers 314 include stored information corresponding to different data patterns likely to be encountered or processed by processor unit 302 corresponding to various operations and/or applications. For example, in FIG. 3, pattern registers 314 include different data patterns$_{0-n}$ 320 each having a corresponding pattern tag$_{0-n}$ 322 associated therewith. Programmable logic 310 enables various data patterns 320 and corresponding pattern tags 322 to be modified, added, deleted, etc., based on different data patterns likely to be encountered by processor unit 302. For example, different data patterns 320 may include specific patterns or image information, semaphores, specific blocks of data or other known or anticipated data patterns (e.g., all binary value "0"s, all binary value "1"s, a pattern "40404040" representing a particular set of semaphores, etc.). Pattern tags 322 are representative of the particular data pattern associated therewith such that the pattern tag 322 is sent or transmitted across a system bus or communication fabric instead of the corresponding data pattern, thereby reducing latency and power consumption associated with read/write command processing. For example, the pattern tag 322 may comprise one or several bits of information being indicative of a particular data pattern. In some embodiments, pattern tag 322 may be communicated over a system bus as part or a read/write command.

Logic 310 also includes pattern detector 312 configured to evaluate data to be written to a memory subsystem by processor unit 302 with stored data patterns 320. Detector 312 is also used to evaluate received pattern tags with stored patterned tags 322 to determine corresponding data patterns 320. As will be described more fully below, logic 310 is used to compare data to be written to a memory subsystem with data patterns 320 and, responsive to a match between the data to be written to the memory subsystem and a particular data pattern 320, processor unit 302 substitutes the corresponding pattern tag 322 for the matching data pattern and discards the corresponding data pattern while transmitting the pattern tag 322 to the memory subsystem. Additionally, in some embodiments, a data read request may result in receipt of a pattern tag (e.g., from memory buffer 340). Logic 310 identifies the corresponding data pattern 320 based on the received pattern tag and returns the corresponding data pattern as a result of the data read operation.

In FIG. 3, memory buffer 340 also includes programmable logic 350 having a pattern detector 352 and one or more pattern registers 360 having stored therein different data patterns$_{0-n}$ 362 each associated with a corresponding pattern tag$_{0-n}$ 364. Pattern detector 352 and/or programmable logic 350 may reside as software and/or an algorithm running on a processor unit of memory buffer 340; however, it should be understood that pattern detector 352 and/or programmable logic 350 may comprise hardware logic residing in a processor or other type of logic chip. The functions of pattern detector 352 and/or programmable logic 350 may also be centralized in a single integrated circuit or distributed among different chips in a data processing system. As indicated above with respect to programmable logic 310, programmable logic 350 enables different data patterns 362 and corresponding pattern tags 364 to be added, deleted, modified etc., based on the types of data patterns likely to be encountered by system 300. Detector 352 is configured to evaluate data to be written to a memory subsystem (e.g., DRAM 344) with stored data patterns 362. Detector 312 is also used to evaluate received pattern tags (e.g., received from processor unit 302 and/or read from memory device 342) with stored patterned tags 364 to identify corresponding data patterns 362. Thus, data patterns 320 correspond to data patterns 362 and pattern tags 322 correspond to pattern tags 364 to enable identification and reading/writing of corresponding information/data. It should also be understood that logic such as logic 310 and/or logic 350 may be located elsewhere in a data processing system or platform to enable pattern tag communications across different system buses and decoding of the pattern tags at different locations in a data processing system.

In operation, in some embodiments, data to be written to a memory subsystem is compared by processor unit 302 to data patterns 320. As indicated above, data patterns 320 correspond to different data patterns likely to be encountered by system 300 based on the type of data and/or operations being performed or executed by system 300. If a match is found between the data to be written to a memory subsystem and one or more data patterns 320, processor unit 302 substitutes the corresponding pattern tag 322 for the matching data, discards the matching data, and transmits the corresponding pattern tag 322 across a communications bus to the designated memory device.

In some embodiments, a marker may be stored in a memory subsystem to enable a determination of whether stored bits are pattern tags or the data pattern itself. The marker may be a single bit of data, a flag or other type of indicator. It should be understood that writing to a memory subsystem may include writing to a plurality of memory subsystems in parallel. For example, space for storage of the marker may be provided by adding more memory devices to the memory interface. In some embodiments, even though a pattern tag is generally smaller than its associated data pattern, the pattern tag is stored in the same memory address of the memory subsystem that the corresponding data pattern would have been stored in. In some embodiments, a memory copy function may be implemented where copying of data from one set of memory addresses to a second set of memory addresses may be achieved by, for example, identifying a pattern tag from data read in a first memory address and transmitting the pattern tag to the second memory address without converting the pattern tag into a data pattern. In this example, any data that is not a pattern tag may be either transmitted directly to the second memory address or may be compared against the data patterns for possible matches. If a match is encountered, a pattern tag may be transmitted to the second memory address instead of the data pattern. In some embodiments, the memory subsystem may be configured to utilize smaller communication bandwidth resources when writing or reading a pattern tag than when writing or reading the data pattern. Thus, in this example, the copy function described above may be executed much faster by configuring the memory subsystems accordingly.

In some embodiments, memory buffer 340 receives pattern tags 322 from processor unit 302 and uses logic 350 to evaluate the received pattern tags with stored pattern tags 364. Thus, in operation, memory buffer 340 receives pattern tags 322 from processor unit 302, locates the corresponding pattern tag 364 in register 360 and identifies the corresponding data pattern 362. Memory buffer 340 discards the pattern tag 322 and substitutes therefor the corresponding data pattern 362 and writes the corresponding data pattern 362 to memory device 342. It should be understood that in some embodiments, programmable logic 350 may be omitted from memory buffer 340 such that memory buffer 340 receives pattern tags 322 from processor unit 302 and writes the corresponding pattern tags 322 to memory device 342.

In operation, read requests are processed generally in reverse order of the process described above for write commands. For example, in response to receiving a read command or request (e.g., from processor unit 302), memory buffer 340 accesses memory device 342 and reads information from memory device 342. The information read out from memory device 342 may be pattern tags, other data, or a combination thereof. If pattern tags are stored in memory device 342, memory buffer 340 may be configured to read the pattern tag out of memory device 342 and forward the read pattern tag to processor unit 302. Processor unit 302, using logic 310, identifies the corresponding pattern tag 322 stored in registers 314 and identifies the corresponding data pattern 314 associated with the particular pattern tag 322. Processor unit 302 discards the pattern tag 322 and/or otherwise replaces the pattern tag 322 with the corresponding data pattern 320 and returns the corresponding data pattern 320 as the read result. Thus, in the described embodiment, programmable logic 350 may be omitted from memory buffer 340 such that memory buffer 340 passes pattern tags stored in memory device 342 to processor unit 302.

In some embodiments, in response to receiving a read request (e.g., from processor unit 302), memory buffer 340 accesses memory device 342 and reads data out of memory device 342. Memory buffer 340, using logic 350, compares the read data to data patterns 362 stored in registers 360, and responsive to identifying a match between the read data and one or more data patterns 362, substitutes the matching data patterns 362 with corresponding pattern tags 364. Thus, in this embodiment, read data matching one or more data patterns 362 is discarded and/or otherwise substituted with pattern tags 364. Memory buffer 340 then transmits or otherwise communicates the pattern tags 364 across a system bus to the requesting device (e.g., to processor unit 302). If processor unit 302 is the requesting device, logic 310 evaluates the received pattern tags 364, identifies corresponding pattern tags 322, identifies corresponding data patterns 320, and returns the data patterns 320 as the read result.

In some embodiments, both a pattern tag and its corresponding data pattern may be stored in DRAM 344. For example, in some embodiments, memory buffer 340 may receive a pattern tag 322 from processor unit and identify its corresponding pattern tag 364 and data pattern 362 from registers 360. Memory buffer 340 may store both the pattern tag 364 and corresponding data pattern 362 in memory device 342. In response to receiving a read request, memory buffer 340 may read information from memory device 342 and, in response to reading a pattern tag, remaining transfer of its associated data pattern from memory device 342 is aborted.

In some embodiments, pattern tags may be substituted for portions of data lines. For example, if a cache line is 128 bytes, detector 312 may determine that 16 bytes of the 128 byte cache line correspond to one or more particular data patterns 320. The particular pattern tags can be transmitted to the next level cache or other memory device along with any remaining non-matching data. Thus, the information transmitted across a system bus may comprise pattern tags and/or a combination of pattern tags and non-matching data (or all non-matching data in the event none of the data matches a store data pattern). In some embodiments, a particular pattern tag may also be used to represent multiple pattern tags. For example, in some embodiments, if several portions of a cache line each correspond to a particular data pattern 320, thereby resulting in a repeated pattern tag corresponding to each matching portion, a different pattern tag may be used to represent the repeating pattern tag. Thus, instead of transmitting multiple instances of the same pattern tag, a different pattern tag may be used to represent the repeating instances. It should be understood that certain pattern tags may be created that are used to represent a variety of types, series, sequences or combinations of pattern tags.

Figure 4:
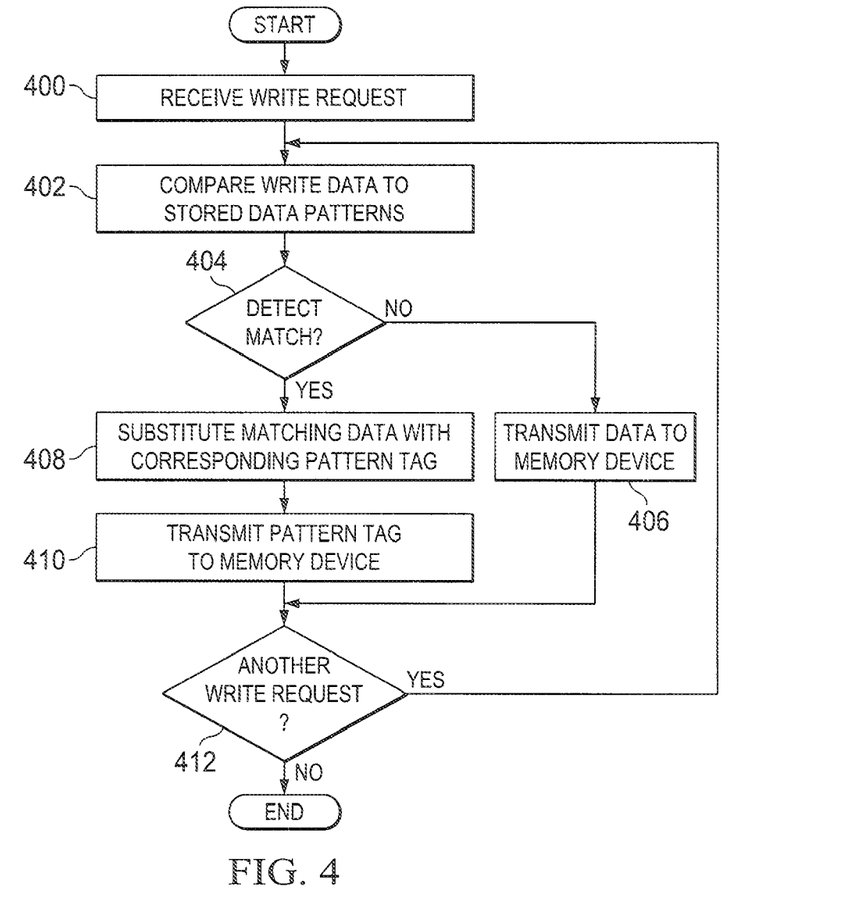
FIG. 4 is a flow diagram illustrating an embodiment of a memory management method.

FIG. 4 is a flow diagram illustrating an embodiment as a data transfer management method in accordance with the present disclosure. The method begins at block 400, where a write request or command is received. In response to receiving a write request to write particular data to a memory subsystem, the data to be written to the memory subsystem is compared to stored data patterns (e.g., data patterns 320). At block 404, a determination is made whether the data to be written to a memory device matches one or more stored data patterns. If no matches are detected, the method proceeds to block 406, where the data to be written to a memory device is transferred to the memory device. If at block 404 a match is detected between the data to be written to the memory subsystem and one or more stored data patterns, the method proceeds to block 408, where pattern tags are substituted for the corresponding matching data patterns. The data matching the stored data patterns may be discarded. At block 410, the pattern tags are transmitted across a system bus to a designated memory device. At decisional block 412, a determination is made whether another write request or command has been received. If not, the method ends. If so, the method returns to block 402.

Figure 5:
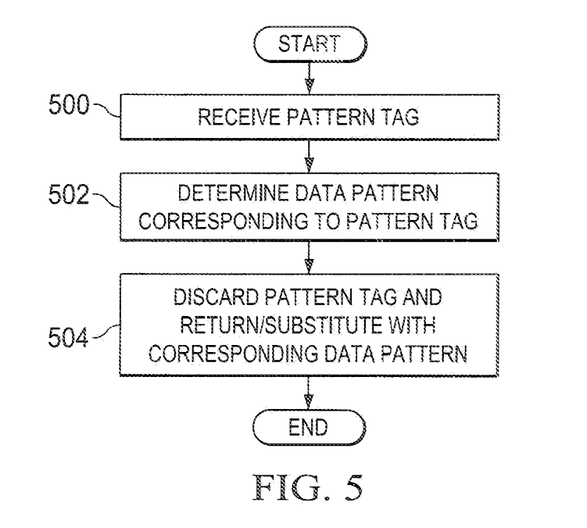
FIG. 5 is a flow diagram illustrating another embodiment of a memory management method.

FIG. 5 is a flow diagram illustrating another embodiment of a data transfer manager method in accordance with the present disclosure. The method begins a block 500, where a pattern tag is received. The pattern tag may be received in response to a read or write command or request (e.g., received by processor unit 302, received by memory buffer 340, etc.). At block 502, the pattern tag is used to identify the corresponding data pattern (e.g., using information stored in registers 314 or 360). At block 504, the pattern tag is discarded and the corresponding data pattern is substituted therefor and returned as the result of the read or write request.

Figure 6:
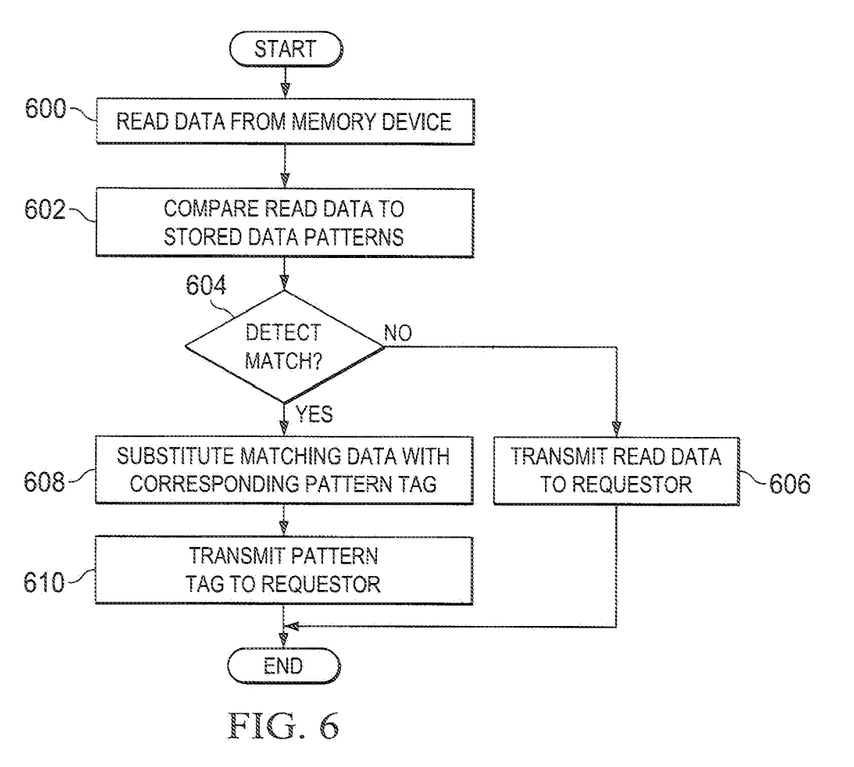
FIG. 6 is a flow diagram illustrating another embodiment of a memory management method.

FIG. 6 is a flow diagram illustrating another embodiment of a data transfer management method in accordance with the present disclosure. The method begins at block 600, where data is read from a memory device. At block 602, the read data is compared to one or more stored data patterns (e.g., data patterns 362). At decisional block 604, a determination is made whether the read data matches one or more stored data patterns. If no match is detected, the method proceeds to block 606, where the read data is transmitted to the requesting device. If a match is detected at block 604, the method proceeds to block 608, where matching data patterns are discarded and substituted therefor with a corresponding pattern tag representative of the data pattern (e.g., pattern tags 364). At block 610, the pattern tag is transmitted to the requesting device.

Thus, embodiments of the present disclosure reduce bus traffic, thereby yielding a greater bandwidth and reducing latency associated with data transfer. Embodiments of the present disclosure also reduce power consumption that may be otherwise associated with data compression routines performed at a file or software application level.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
receiving and storing a plurality of different data patterns anticipated to be encountered by a processor unit of a data processing system corresponding to a particular application being processed;
responsive to receiving a read request, reading data from a memory subsystem;
determining whether the read data includes a pattern tag;
for the read data not being a pattern tag, comparing by the memory subsystem the read data to the stored data patterns;
responsive to determining that the read data matches at least one of the stored data patterns, replacing by the memory subsystem the matching read data with a pattern tag corresponding to the matching data pattern;
transmitting the pattern tag to the processor unit instead of the requested data as a response to the read request; and
responsive to receiving the pattern tag at the processor unit, replacing the pattern tag with the corresponding data pattern.

2. The method of claim 1, further comprising:
accessing, by a memory buffer, a memory device;
reading the requested data out of the memory device; and
comparing by the memory buffer the read data to the stored data patterns.

3. The method of claim 1, further comprising storing a marker in the memory subsystem indicative of whether stored information is a particular data pattern or pattern tag.

4. The method of claim 1, further comprising storing the plurality of different data patterns and corresponding pattern tags in registers of a memory buffer.

5. The method of claim 1, further comprising receiving input modifying the stored data pattern.

6. The method of claim 1, further comprising:
receiving at a memory buffer the pattern tag from the processor unit;
determining the data corresponding to the pattern tag; and
writing the corresponding data to a memory device.

7. The method of claim 6, further comprising transmitting by the memory buffer the pattern tag to the processor.

8. A system comprising:
a memory subsystem having stored therein a plurality of different data patterns anticipated to be encountered by a processor unit corresponding to a particular application being processed, the memory subsystem further having stored therein a plurality of different pattern tags corresponding to the respective data patterns; and
programmable logic configured to, responsive to receiving a read request:
read data from a memory device;
determine whether the read data includes at least one of the pattern tags;
for the read data not being at least one of the pattern tags, compare the read data with the data patterns;
responsive to the read data matching at least one of the data patterns, replace the read data matching the data pattern with the corresponding pattern tag; and
transmit the pattern tag to the processor unit instead of the requested data as a response to the read request.

9. The system of claim 8, further comprising a memory buffer configured with the programmable logic to:
read the requested data out of the memory device; and
compare the read data to the stored data patterns.

10. The system of claim 8, further comprising a memory buffer configured with the programmable logic to transmit the pattern tag to the processor unit.

11. The system of claim 8, wherein the programmable logic is configured to store a marker in the memory subsystem indicative of whether stored information is a particular data pattern or pattern tag.

12. The system of claim 8, further comprising a memory buffer configured to:
receive the pattern tag from the processor unit;
determine matching data corresponding to the pattern tag; and
write the corresponding matching data to the memory device.

13. The system of claim 12, wherein the programmable logic is configured to enable a modification to the stored data pattern.

14. A computer program product for data transfer management, the computer program product comprising:
a non-transitory computer readable medium having computer readable program code embodied therewith, the computer readable program code comprising computer readable program code configured to:
receive and store a plurality of different data patterns anticipated to be encountered by a processor unit of a data processing system corresponding to a particular application being processed;
responsive to receiving a read request, read data from a memory subsystem;
determine whether the read data includes a pattern tag;
for the read data not being a pattern tag, compare the read data to the stored data patterns;
responsive to determining that the read data matches at least one of the stored data patterns, replace the matching read data with a pattern tag corresponding to the matching data pattern; and
transmit the pattern tag to the processor unit instead of the requested data as a response to the read request.

15. The computer program product of claim 14, wherein the computer readable program code is configured to:
cause a memory buffer to access a memory device;
read the requested data out of the memory device; and
cause the memory buffer to compare the read data to the stored data patterns.

16. The computer program product of claim 14, wherein the computer readable program code is configured to:
receive the pattern tag from the processor unit;
determine matching data corresponding to the pattern tag; and
write the corresponding matching data to the memory device.

17. The computer program product of claim 16, wherein the computer readable program code is configured to cause a memory buffer to transmit the pattern tag to the processor unit.

18. The computer program product of claim 16, wherein the computer readable program code is configured to enable a modification to the stored data pattern.

* * * * *